United States Patent
Kandler (10) Patent No.: US 7,116,939 B1
(45) Date of Patent: Oct. 3, 2006

(54) WIRELESS PROVISION OF AUDIO CONTENT

(75) Inventor: Gershon Kandler, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 09/832,654

(22) Filed: Apr. 11, 2001

Related U.S. Application Data (60) Provisional application No. 60/209,019, filed on Jun. 1, 2000.

(51) Int. Cl.
*H04B 5/00* (2006.01)

(52) U.S. Cl. ............... 455/41.3; 455/3.01; 455/412.1; 455/414.3

(58) Field of Classification Search ........... 455/41.2, 455/41.3, 11.1, 412.1, 414.1, 414.3, 3.01, 455/3.05, 3.06, 569.1, 569.2; 701/214
See application file for complete search history.

(56) References Cited

U.S. PATENT DOCUMENTS

| 5,742,893 | A | | 4/1998 | Frank |
| 6,134,456 | A | * | 10/2000 | Chen ................ 455/569.2 |
| 6,600,918 | B1 | * | 7/2003 | Youngs et al. ........ 455/414.3 |
| 2002/0197955 | A1 | * | 12/2002 | Witkowski et al. ....... 455/41 |

FOREIGN PATENT DOCUMENTS

| EP | 0 898 378 A2 | 2/1999 |
| JP | 7-500715 | 1/1995 |
| JP | 8-213961 | 8/1996 |
| JP | 11-68685 | 3/1999 |
| WO | WO-99/28884 | 6/1999 |
| WO | WO-99/39466 A1 | 8/1999 |

OTHER PUBLICATIONS

1. BLUETOOTH® Wireless Communication Protocol, 1999, 5 pages, (http://www.motorola.com/bluetooth/action/action/html).
Junichiro Tsui et al., "Proposal for transfer error recovering on broadcasting network", Information Processing Society of Japan, Research Report, vol. 99, No. 13, pp. 71-77, Feb. 1999. (An English Abstract).

* cited by examiner

*Primary Examiner*—Lee Nguyen
(74) *Attorney, Agent, or Firm*—Darby & Darby (57) ABSTRACT

Apparatus for in-vehicle provision of audio content to a listener. The apparatus includes a cellular telephone adapted to receive broadcast radio content over a wireless network, and an in-vehicle audio system adapted to be fixedly installed in a vehicle, and coupled to receive the broadcast radio content from the cellular telephone, and to play the content in the vehicle.

36 Claims, 7 Drawing Sheets

WIRELESS PROVISION OF AUDIO CONTENT

CROSS-REFERENCE TO RELATED APPLICATIONS

This application claims the benefit of U.S. Provisional Patent Application 60/209,019, filed Jun. 1, 2000, which is incorporated herein by reference.

FIELD OF THE INVENTION

The present invention relates to the field of provision of audio content, particularly wireless provision of audio content via a cellular telephone.

BACKGROUND OF THE INVENTION

The majority of cars and other vehicles contain in-vehicle audio systems containing relatively high quality audio components such as amplifiers and speakers. Such in-vehicle audio systems typically include radios, and cassette, CD and minidisk players, and the like. However, the range of audio content available to a listener of in-vehicle audio devices is limited.

A listener to a radio is limited temporally to the programming available at that time. If a listener misses a desired radio program at its normal broadcast time, he is unable to listen to that program later, at a time convenient for him, unless he recorded it during broadcast. A radio listener is also limited geographically to the programming broadcast from a within-range radio transmitter. It is currently not possible for a radio listener to travel abroad and still receive broadcasts from his home country's local radio stations on an in-vehicle radio. There is thus a need for a method for listening to a radio program via an in-vehicle radio system, while the radio program is not being currently transmitted on an in-range transmitter, without the listener having to pre-record the program.

A listener to in-vehicle audio devices, such as a cassette or CD player, is limited to the selection of prerecorded audio content, typically music, that he has available in the appropriate format.

A large amount of audio content, including both music and spoken content, is available over the Internet. The majority of in-vehicle audio systems are not Internet-enabled, however.

A large number of listeners to in-vehicle audio devices also possess cellular phones. New generations of cellular phones are Internet-enabled, allowing audio content to be downloaded from the Internet. The sound quality from cellular phones is typically poor as they are designed to minimize size and weight and are intended to be used by a single user, while being held close to the ear. Cellular phones are not designed for broadcasting music to a number of listeners. There is thus also a need for apparatus and a method for improving the sound quality of audio content downloaded from a network such as the Internet, through a cellular phone.

SUMMARY OF THE INVENTION

The present invention seeks to provide apparatus and methods for receiving audio content, typically in the form of files, from a network such as the Internet via a cellular phone, and for playing the downloaded audio content over regular radio or stereo equipment. In one embodiment, the radio or stereo equipment is located within a vehicle. The vehicle stereo provides high quality sound, not available from the cellular telephone, and may also provide a buffering memory, e.g., a hard disk, for storing downloaded audio files for playback. The cellular phone provides a user interface and data channel to an application server as an extension to the car radio/stereo.

In a preferred embodiment, the cellular phone is Internet enabled, using a protocol such as WAP (Wireless Access Protocol), to retrieve audio files from the Internet. In an alternative embodiment, the cellular phone uses packet-oriented cellular protocols and networks. A typical, but non-limiting, example of a packet-oriented cellular protocol is GPRS (General Packet Radio Service), which is a data service currently offered in some GSM networks.

In a preferred embodiment, the cellular phone and the radio or stereo equipment are able to communicate with each other over a short-range wireless channel, using a communication protocol such as Bluetooth™.

In a preferred embodiment, a user specifies the desired radio stations, or individual radio programs, typically by presetting a radio to the desired program or station. This information is transmitted from the radio to the telephone, which then contacts an application server which has an accessible archive of the radio station's programs, and downloads the requested programming, typically as audio files. The audio content is transferred from the telephone to the radio for playback to the user. Thus, the user is able to listen to programming at substantially any desired time and place, without being bound by the geographical limits and programming schedule of a given radio station.

There is thus provided in accordance with a preferred embodiment of the present invention, apparatus for in-vehicle provision of audio content to a listener. The apparatus includes a cellular telephone adapted to receive broadcast radio content over a wireless network, and an in-vehicle audio system, adapted to be fixedly installed in a vehicle, and coupled to receive the broadcast radio content from the cellular telephone, and to play the content in the vehicle.

Further in accordance with a preferred embodiment of the present invention, the cellular telephone is adapted to receive the broadcast radio content over the wireless network at a time when the radio content is not being broadcast over radio channels.

Still further in accordance with a preferred embodiment of the present invention, the cellular telephone is adapted to receive the broadcast radio content over the wireless network at a location where the radio content cannot be received over radio channels.

Additionally in accordance with a preferred embodiment of the present invention, the broadcast radio content received over the wireless network is user-selected.

Also in accordance with a preferred embodiment of the present invention, the cellular telephone is adapted to receive, from a user, an input including at least one detail regarding the broadcast radio content to be received, and to transmit the at least one detail to a content provider over the wireless network.

Further in accordance with a preferred embodiment of the present invention, the input comprises a verbal input.

Still further in accordance with a preferred embodiment of the present invention, the cellular telephone comprises buttons, and the input comprises contacting the buttons.

Additionally in accordance with a preferred embodiment of the present invention, the audio system is adapted to receive, from a user, an input including at least one detail regarding the broadcast radio content to be received, and to transmit the at least one detail to the cellular telephone.

Also in accordance with a preferred embodiment of the present invention, the in-vehicle audio system can function as a radio independent of the cellular phone, and is adapted to receive, as the input, at least one identification detail of the radio station to which the radio is tuned.

Further in accordance with a preferred embodiment of the present invention, the at least one identification detail is selected from the group consisting of radio station name, radio station ID code, radio station broadcast frequency, and radio station URL.

Still further in accordance with a preferred embodiment of the present invention, the cellular telephone is adapted to transfer the audio content to the in-vehicle audio system via a wireless link therebetween.

Additionally in accordance with a preferred embodiment of the present invention, the cellular telephone is adapted to transfer the audio content to the in-vehicle audio system via a wired link therebetween.

There is also provided in accordance with another preferred embodiment of the present invention, apparatus for storing user radio station preferences. The apparatus includes a cellular telephone having a memory, and an in-vehicle audio system, adapted to be fixedly installed in a vehicle and to play broadcast radio content therein, and adapted to receive, from a user, at least one identification detail regarding a radio station preferred by the user, and to transmit the at least one detail to the cellular telephone for storage in the memory.

Further in accordance with a preferred embodiment of the present invention, the cellular telephone is adapted to transmit the at least one detail of the preferred radio station to another in-vehicle audio system.

Still further in accordance with a preferred embodiment of the present invention, the other in-vehicle audio system is adapted to receive the at least one detail from the cellular telephone and, responsive thereto, to receive and play broadcast radio content from the preferred radio station.

Additionally in accordance with a preferred embodiment of the present invention, the cellular telephone is adapted to receive broadcast radio content from the preferred radio station over a wireless network, and the other in-vehicle audio system is coupled to receive the broadcast radio content from the cellular telephone, and to play the content in the vehicle.

There is further provided in accordance with a preferred embodiment of the present invention, a method for the in-vehicle provision of audio content to a listener. The method comprises downloading broadcast radio content over a wireless network to a cellular telephone, transferring the content from the cellular telephone to an in-vehicle audio system, and playing the content on the in-vehicle audio system to the listener.

Further in accordance with a preferred embodiment of the present invention, the step of downloading content over the wireless network is performed at a time when the content is not being broadcast over radio channels.

Still further in accordance with a preferred embodiment of the present invention, the step of downloading content over the wireless network is performed at a location where the content can not be received over radio channels.

Additionally in accordance with a preferred embodiment of the present invention, the method also includes the step of selecting the content to be downloaded.

Also in accordance with a preferred embodiment of the present invention, the selecting step includes a user inputting at least one detail regarding the broadcast radio content to be downloaded, and transmitting the at least one detail to a content provider over the wireless network.

Further in accordance with a preferred embodiment of the present invention, the at least one detail is input to the cellular telephone.

Still further in accordance with a preferred embodiment of the present invention, the at least one detail is input to the cellular telephone verbally.

Additionally in accordance with a preferred embodiment of the present invention, the cellular telephone comprises input buttons, and the at least one detail is input to the cellular telephone through contact with the buttons.

Also in accordance with a preferred embodiment of the present invention, the at least one detail is input via the audio system.

Further in accordance with a preferred embodiment of the present invention, the audio system functions as a radio independent of the cellular phone, and the at least one detail includes at least one identification detail of the radio station to which the radio is tuned.

Still further in accordance with a preferred embodiment of the present invention, the at least one detail is stored in a memory in the cellular telephone.

Additionally in accordance with a preferred embodiment of the present invention, the wireless network is the Internet and the cellular telephone is WAP enabled.

Also in accordance with a preferred embodiment of the present invention, the cellular telephone communicates with the wireless network using a packet-oriented cellular protocol.

Further in accordance with a preferred embodiment of the present invention, the wireless network is a GSM network and the packet-oriented cellular protocol is GPRS.

Still further in accordance with a preferred embodiment of the present invention, the content is transferred from the cellular telephone to the audio system via a wireless link therebetween.

Additionally in accordance with a preferred embodiment of the present invention, the wireless link uses a Bluetooth communication protocol.

Also in accordance with a preferred embodiment of the present invention, the content is transferred from the cellular telephone to the audio system via a wired link therebetween.

There is further provided in accordance with a preferred embodiment of the present invention, a method for storing a user's radio station preferences. The method includes inputting at least one identification detail regarding a radio station preferred by a user to an in-vehicle audio system, transmitting the at least one identification detail to a cellular telephone, and storing the at least one detail in a memory in the cellular telephone.

Further in accordance with a preferred embodiment of the present invention, the method also includes transmitting the stored at least one identification detail to another in-vehicle audio system.

Still further in accordance with a preferred embodiment of the present invention, the method also includes identifying the preferred radio station from the at least one detail, and responsive thereto, receiving and playing broadcast radio content from the preferred radio station.

Additionally in accordance with a preferred embodiment of the present invention, the method also includes transmitting the stored at least one identification detail, over a wireless network, to an audio content provider, identifying the preferred radio station from the at least one detail, downloading broadcast radio content over the wireless network to the cellular telephone, transferring the content from the cellular telephone to the in-vehicle audio system, and playing the content on the in-vehicle audio system to a listener.

Also in accordance with a preferred embodiment of the present invention, the at least one identification detail is selected from the group consisting of radio station name, radio station ID code, radio station broadcast frequency, and radio station URL.

BRIEF DESCRIPTION OF THE DRAWINGS

The present invention will be understood and appreciated more fully from the following detailed description, taken in conjunction with the drawings in which:

FIG. 2 consisting of FIGS. 2A and 2B depicts a flowchart detailing a method of downloading and playing desired radio programs to a user via a cellular telephone, in accordance with a preferred embodiment of the present invention;

FIG. 3 consisting of FIGS. 3A and 3B depicts a flow chart detailing a method of receiving desired radio channels when the desired channels are not within broadcast range, in accordance with another preferred embodiment of the present invention;

DETAILED DESCRIPTION OF PREFERRED EMBODIMENTS

Figures 1A, 1B:
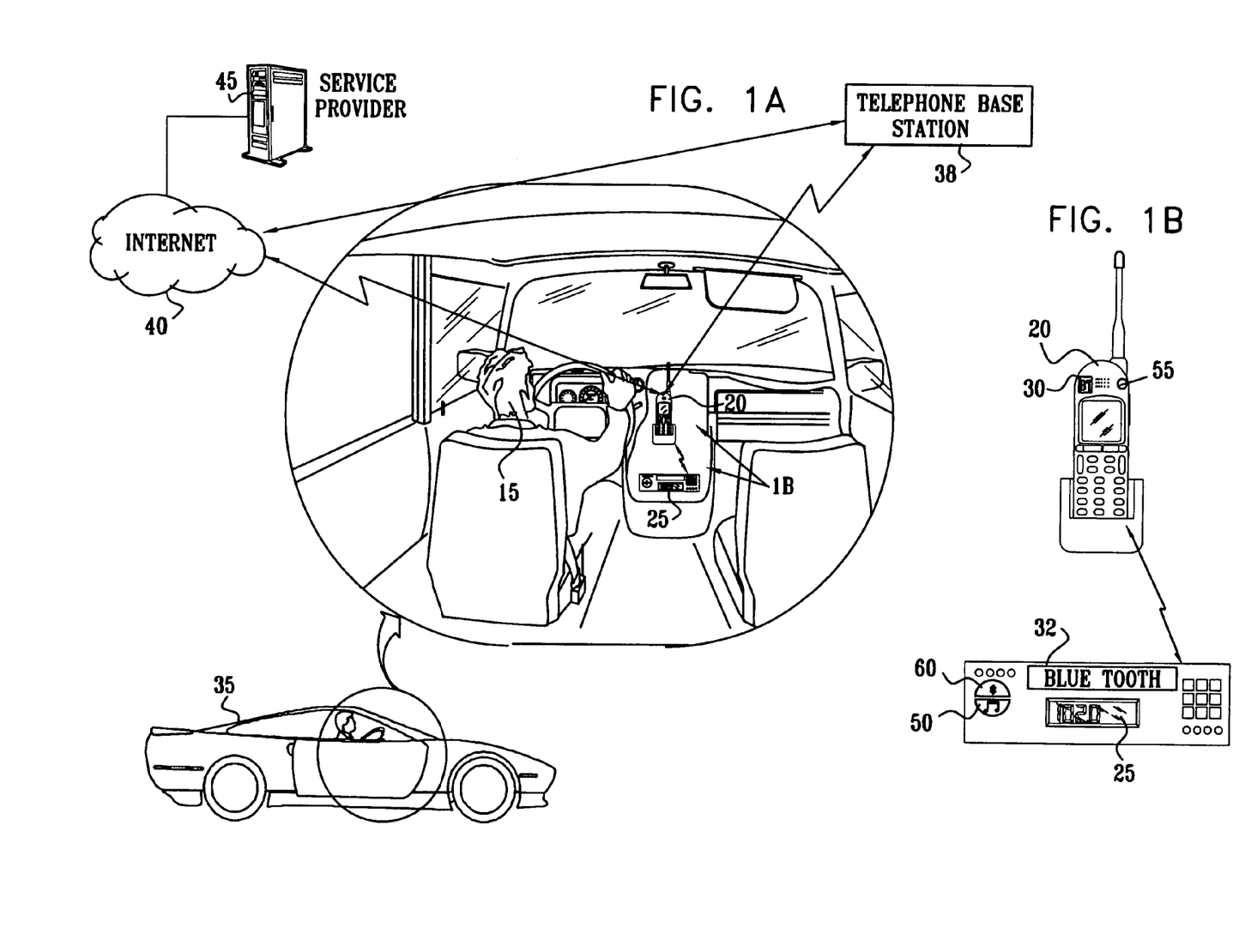
FIG. 1A is a schematic illustration of apparatus for the provision of radio services via a cellular telephone to an in-vehicle audio system, constructed and operative in accordance with a preferred embodiment of the present invention.
FIG. 1B is a schematic illustration of the cellular telephone and in-vehicle audio system of FIG. 1A, constructed and operative in accordance with a preferred embodiment of the present invention.

Reference is now made to FIG. 1A, which is a schematic illustration of apparatus for the provision of radio services via a cellular telephone to an in-vehicle stereo, constructed and operative in accordance with a preferred embodiment of the present invention. As shown, a user 15 possesses a cellular telephone 20, and is the driver of a car 35 which is equipped with a car audio system 25. Cellular telephone 20 may be any conventional cellular telephone with data communication capabilities, such as a WAP-enabled telephone connected to a GSM or UTMS network. Audio system 25 may be any conventional car stereo as is known in the art, and typically comprises a radio receiver, an amplifier and two or more speakers connected thereto.

Reference is now made to FIG. 1B which is a schematic illustration of the cellular telephone and in-vehicle audio system of FIG. 1A, constructed and operative in accordance with a preferred embodiment of the present invention. Cellular telephone 20 and car audio system 25 communicate with each other, typically via transceivers 30, 32, using an internationally accepted wireless communication protocol such as Bluetooth™, http://www.motorola.com/bluetooth/action/action.html. Alternatively, telephone 20 and audio system 25 may communicate via a wired connection.

In a preferred embodiment of the present invention, if the user wishes to listen to audio content that is not immediately available, such as a radio program not being currently broadcast from an in-range transmitter, or music that the user does not possess in the appropriate prerecorded format, the user may select to download the desired content using cellular telephone 20. Audio content is downloaded via a cellular network to which cellular telephone 20 is connected, which in turn transmits the downloaded audio content to car stereo 25 for playing. Typically, the cellular network is linked to a land network, such as the Internet 40, so that the audio content can be retrieved and served to the user from different, widely-dispersed geographic locations.

Exemplary uses of preferred embodiments of the present invention are described below with reference to FIGS. 2–5.

Figure 2A:
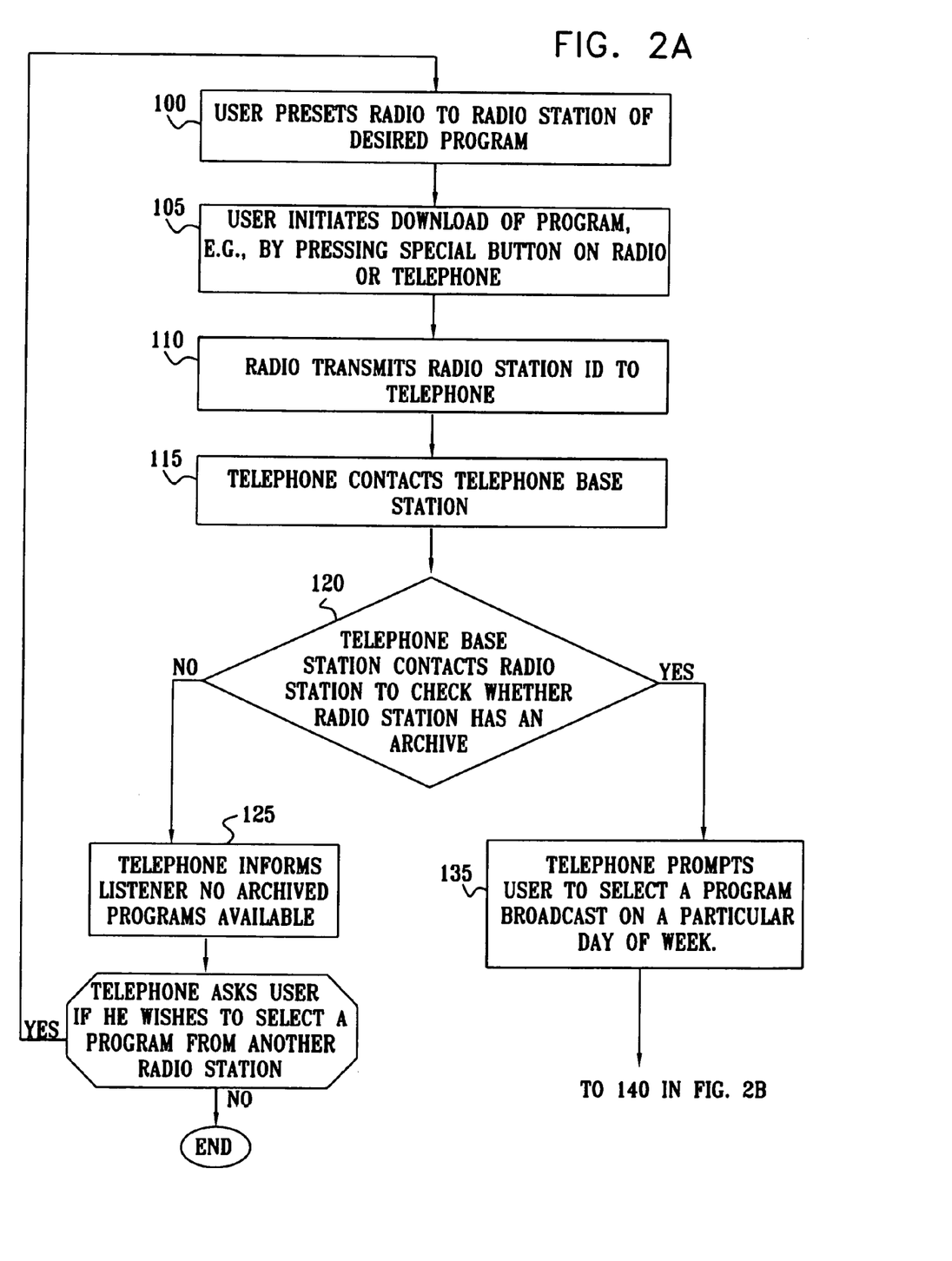
Figure 2B:
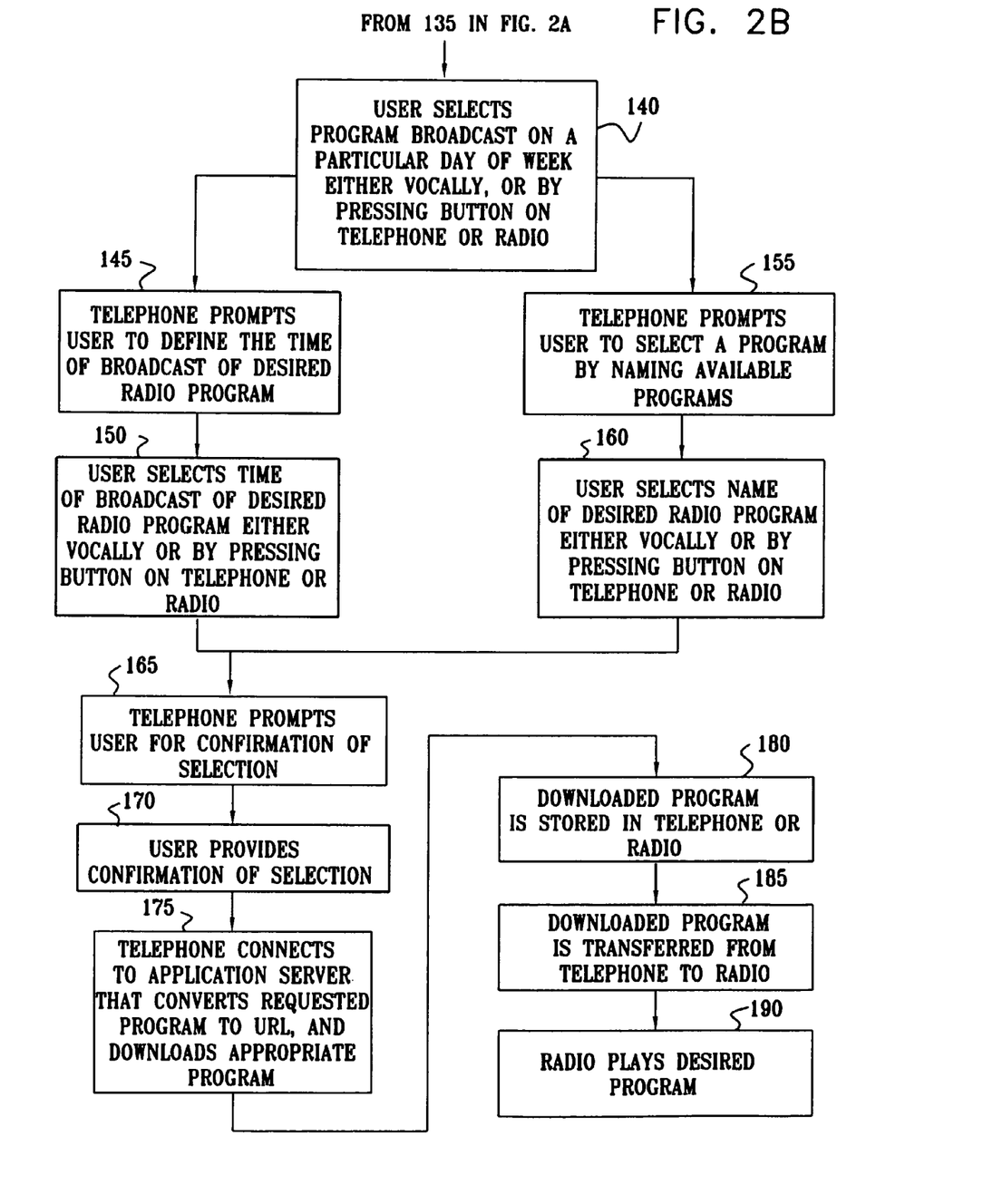

Reference is now made to FIG. 2 which is a flowchart detailing a method of downloading and playing desired radio programs to a user cellular telephone 20, in accordance with a first preferred embodiment of the present invention. The method is typically used when a desired radio program cannot be received via the radio receiver, either because the receiver is not in broadcast range, or the program is not currently being broadcast.

User 15, wishing to listen to a particular radio program which is not currently being broadcast, presets the radio to the station of the desired program (step 100), in substantially the same manner as tuning the radio for normal radio reception. The user initiates the download of the program, e.g., by pressing a specific button 50 on radio 25 or button 55 on telephone 20 (step 105), to signal that the user wishes to listen to a recorded program, rather than the program that is currently being broadcast by the station. In response to pressing this button, car stereo 25 typically transmits the radio station ID to telephone 20 (step 110), which in turn contacts the radio station, typically via a telephone system base station 38, to check whether the radio station has an accessible program archive (step 120).

If the radio station does not have an accessible archive, or if the radio station cannot be contacted, telephone 20 typically informs user 15 that no radio programs are available for that station (step 125). The telephone may ask the user whether he wishes to download a program from a different radio station (step 130).

If the radio station does have an accessible archive, telephone 20 typically takes the user through a series of steps to identify the desired program (steps 135–170). Steps 135, 145, 155, 165 are telephone prompts for information from user 15, and are typically verbal prompts. Alternatively, the prompts could be displayed on a screen on telephone 20, or radio 25. Steps, 140, 150, 160 and 170 are user responses, which may be input either by pressing buttons, typically either on cellular telephone 20 or car stereo 25. It is appreciated however, that user response steps, 140, 150, 160 and 170 could be voice inputs, with voice recognition software to interpret the user's speech. In a preferred embodiment, pressing a voice activation button, such as a button 60 on car stereo 25, at any stage during the interaction switches to voice input mode rather than button pressing mode.

Once user 15 has specified a desired program to the telephone 20, telephone 20 connects via Internet 40 (via base station 38 or through a separate wireless data network) to an application server 45. The server typically converts the user's selection of a desired program into a URL, and downloads the program (step 175), typically in a MP3 file or other compressed digital audio format.

The desired program may be downloaded in its entirety via telephone 20, and stored in a memory (step 180) before being played. The memory may be in telephone 20 or car stereo 25. The program is then transferred to the car stereo 25 (step 185) for playing. Alternatively, the download may be asynchronous, and once a batch of n minutes has been downloaded, it is transferred to car stereo 25 for playing, during which time, telephone 20 downloads the following batch.

Figure 3A:
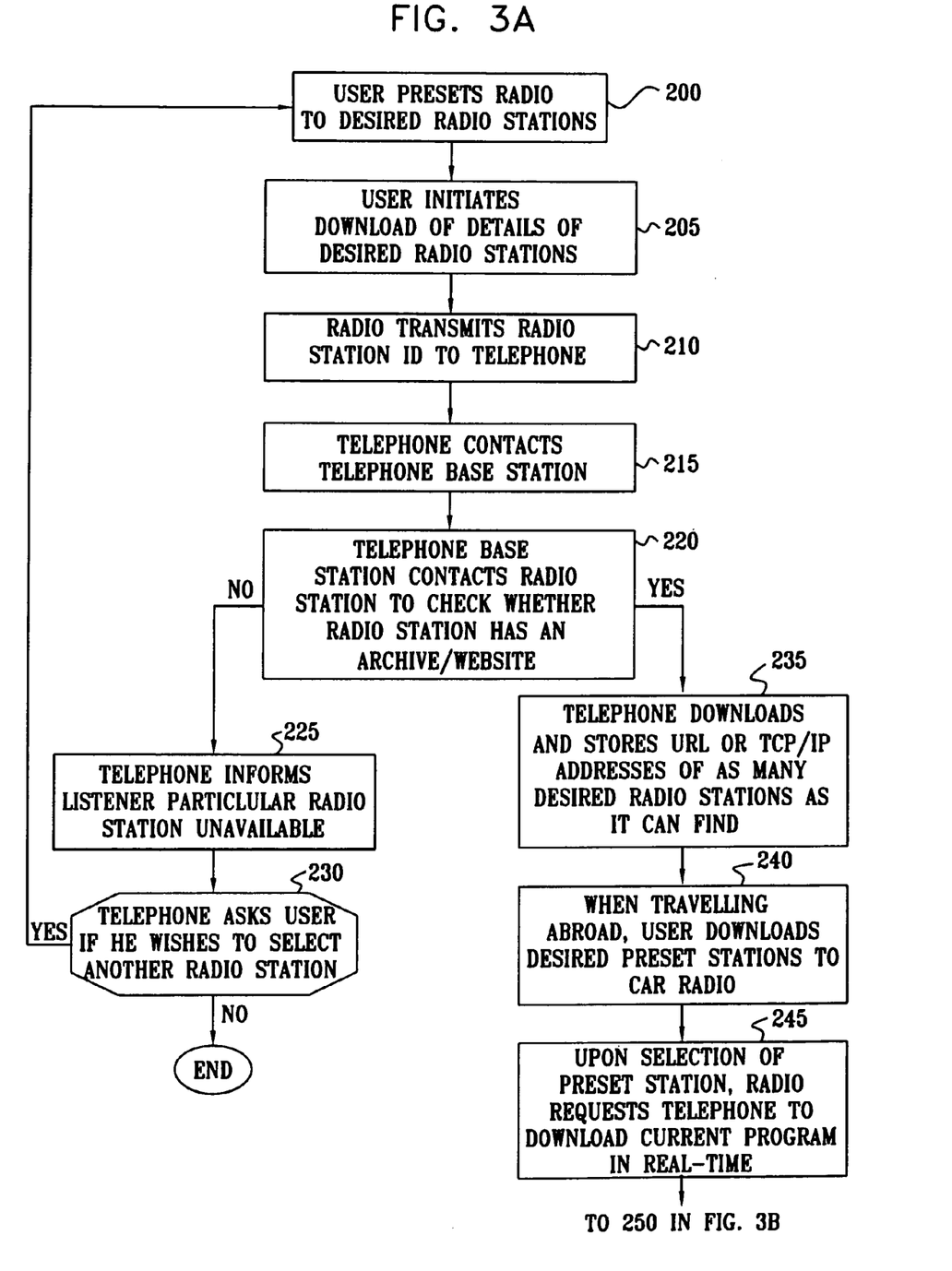
Figure 3B:
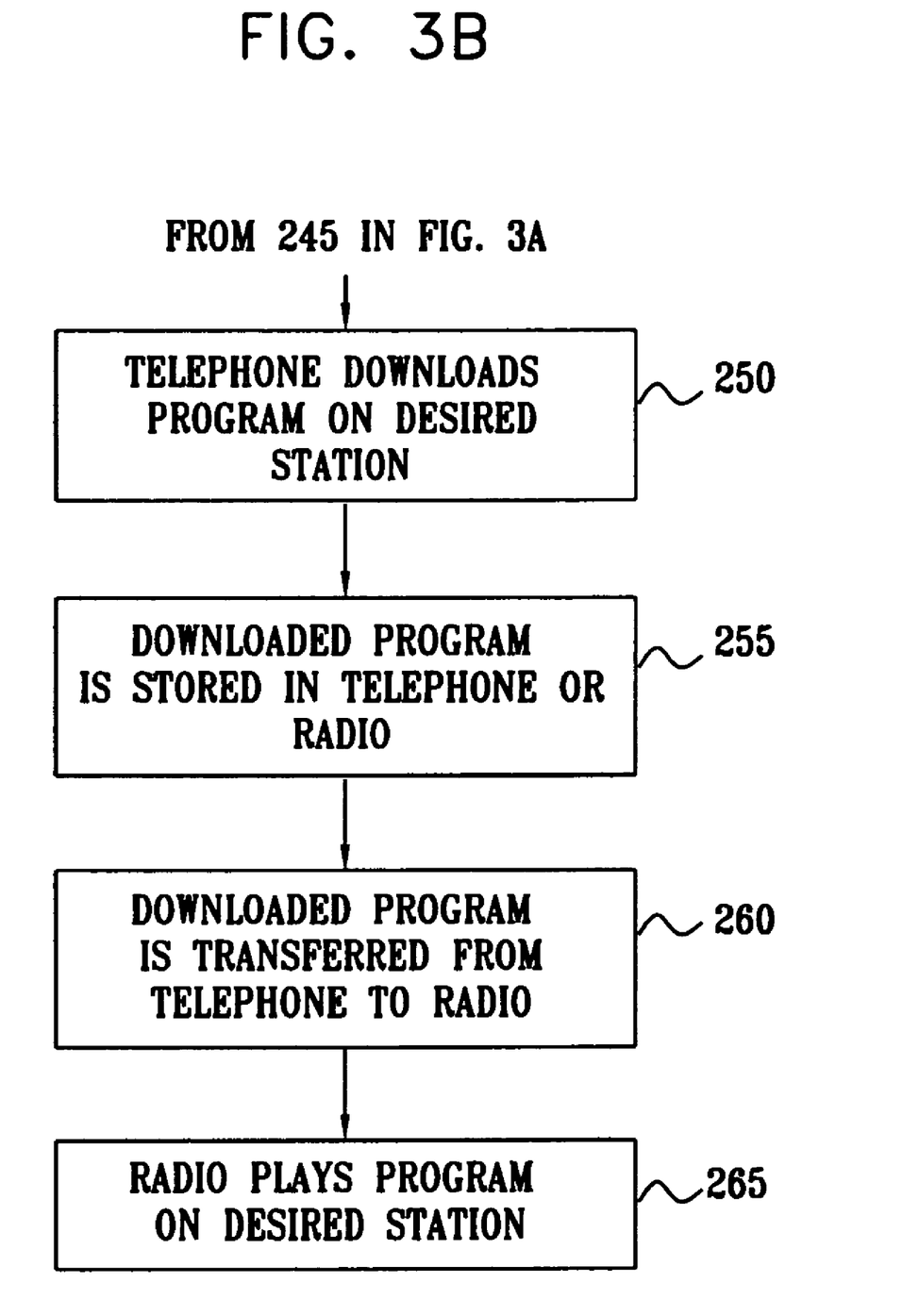

Reference is now made to FIG. 3 which is a flow chart detailing a method of receiving desired radio stations when the desired stations are not within broadcast range, in accordance with another preferred embodiment of the present invention. The method is typically used when a user travels abroad, and wants to listen to his home country radio stations. It is appreciated that this method applies to any situation where a desired radio station is not within broadcast range.

User 15 presets the radio to the desired radio stations, typically while in range of their broadcasts (step 200) and initiates the download of the stations' details, e.g., by pressing button 50 on radio 25 or button 55 on telephone 20 (step 205). Such details typically include identification details, such as name, frequency, alternative frequency and URL, etc. Car stereo 25 typically transmits the radio stations' identification details to telephone 20 (step 210), which in turn contacts the radio stations, typically via telephone system base station 38 (step 215), to check whether the radio stations have an accessible program archive or Web site (step 220).

If one of the radio stations does not have an accessible archive, or cannot be contacted, telephone 20 typically informs user 15 that the specific radio station is not available (step 225). The telephone may ask user 15 whether he wishes to select a different radio station (step 230). Telephone 20 downloads and stores the URL or IP addresses of as many of the desired radio stations as it can find (step 235). The information is preferably stored in a memory of the telephone, such as in a subscriber identity module (SIM).

When travelling abroad, user 15 downloads the stored desired radio stations from telephone 20 to car stereo 25 of a rental car (step 240). When user 15 selects a preset station on radio 25, radio 25 requests telephone 20 to download the current program of that station in real-time. If the user is in a different time-zone in relation to the desired radio station, the user may choose to compensate for the time difference. For example, if there is a two hour time difference between the user's home time and his current local time, the user may either download the home 8:00 AM news broadcast at 8:00 AM local time or 6:00 AM local time. Alternatively, the user may select a program that was broadcast at another, earlier time, using a method such as that described above with reference to FIG. 2.

Telephone 20 typically connects via a network such as Internet 40 to an application server, as described above, which typically converts the selected radio station into a URL, and downloads the program (step 250). As described above with reference to FIG. 2, the programming of the desired station may be downloaded synchronously or asynchronously, and may be stored on a memory in either the telephone or the radio (steps 250–255). The downloaded programming is transferred from telephone 20 to car stereo 25 (step 260) for playing on the car stereo (step 265).

It is appreciated that the method described above with reference to steps 200–240 of FIG. 3 can be used as a method to store, in a user's cellular phone, the user's preferences for preset channels for a car radio. When the user drives a different car, e.g. a new car or a rental car, the cellular telephone can download details of the user's preferred radio stations to the car radio 20, thus personalizing a user's car stereo. In place of steps 245–260, the car stereo 20 would first check to determine whether the desired radio stations are available via regular radio broadcasts, without first having to download them via the cellular telephone.

Figure 4:
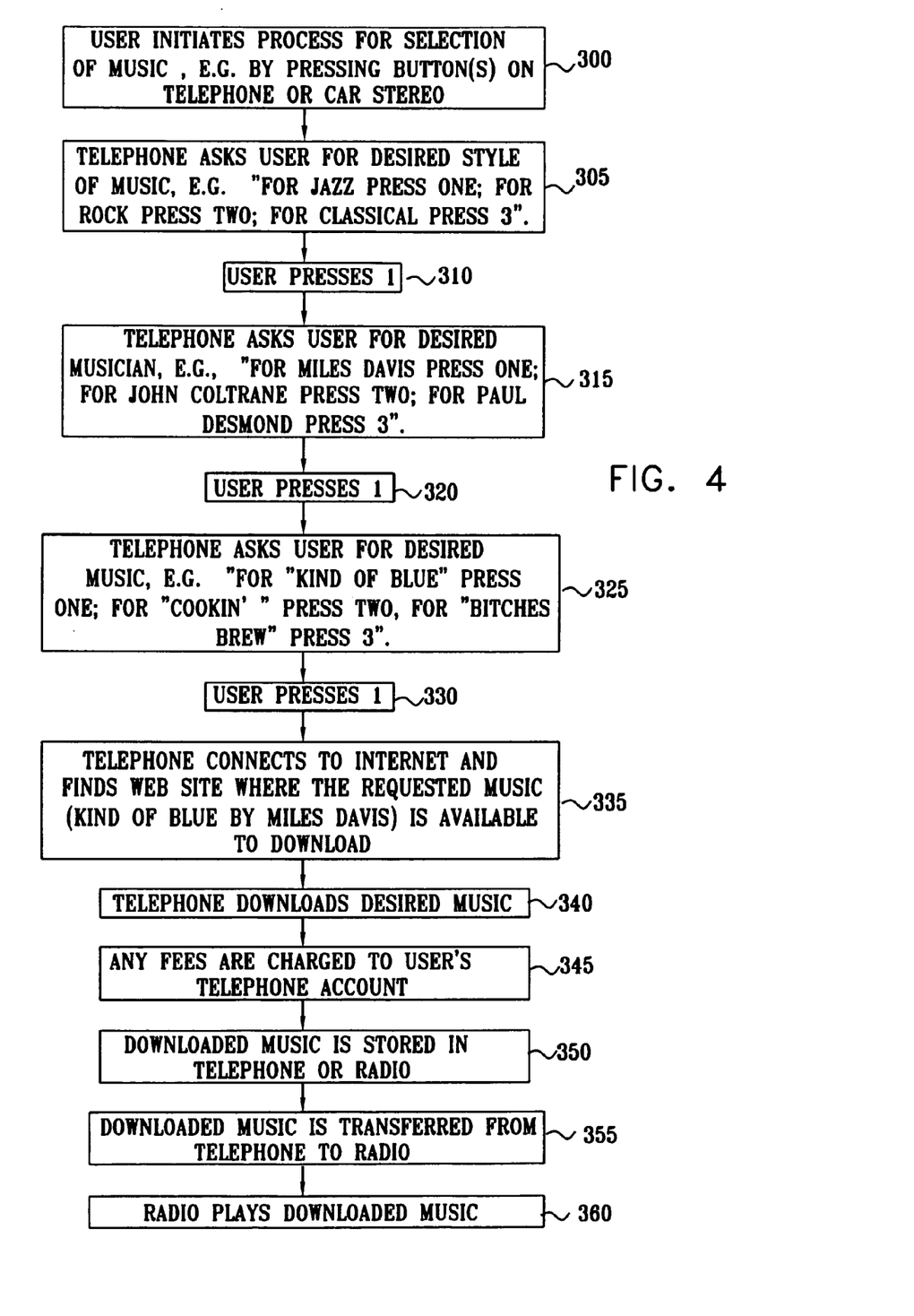
FIG. 4 is a flow chart detailing a method of downloading and playing desired audio content from the Internet, via a cellular phone, in accordance with another preferred embodiment of the present invention.

Reference is now made to FIG. 4 which is a flow chart detailing a method of downloading and playing desired audio content from the Internet, via a cellular phone, in accordance with another preferred embodiment of the present invention. The method is typically used when a user wishes to listen to music, or other audio content, but does not have a prerecorded copy of the music in the appropriate storage format for car-stereo.

User 15 initiates the process of downloading music, e.g., by pressing button 50 on radio 25 or button 55 on telephone 20 (step 300). Telephone 20 typically takes the user through a series of steps to identify the desired music (steps 305–330). Steps 305, 315 and 325 are telephone prompts for information from user 15, and are typically verbal prompts. Alternatively, the prompts could be displayed on a screen on telephone 20, or radio 25. Steps, 310, 320 and 330 are user responses, which may be input either by pressing buttons, typically either on cellular telephone 20 or car stereo 25. It is appreciated however, that user response steps, 310, 320 and 330 could be voice inputs, with voice recognition software to interpret the user's speech.

Once user 15 has specified a desired piece of music to the telephone 20, telephone 20 searches for and connects via a network such as the Internet 40 to an application server that has the requested piece of music available for download. (step 335), and downloads the music (step 340).

If there is a fee involved in downloading the music, the fee may be charged to the user's telephone account (step 345).

The downloaded music is transferred from telephone 20 to stereo 25 (step 355), where it is played to user 15 (step 360).

The desired program may be downloaded in its entirety via telephone 20, and stored in a memory (step 350) before being played. The memory may be in telephone 20 or stereo 25. The program is transferred to stereo 25 (step 355) for playing. Alternatively, the download may be asynchronous, and once a batch of n minutes has been downloaded, it is transferred to stereo 25 for playing, during which time telephone 20 downloads the following batch.

Figure 5:
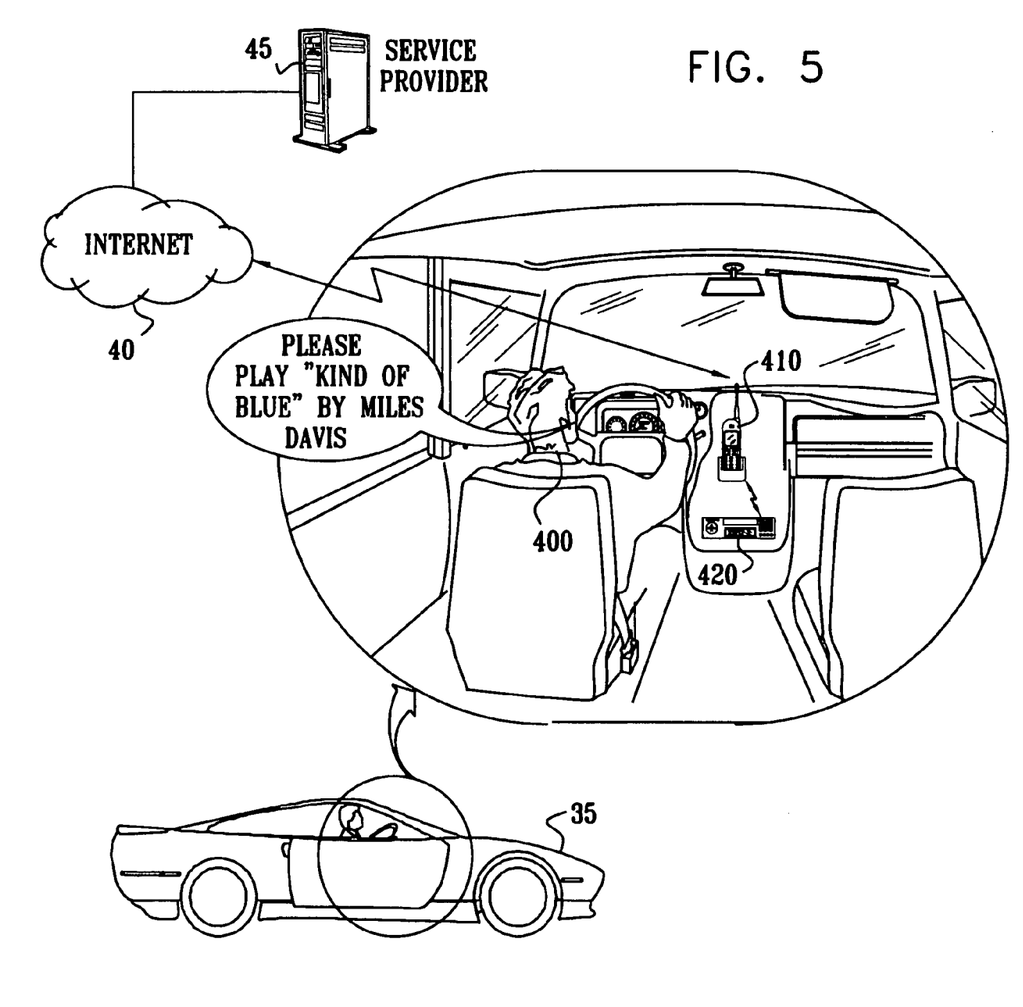
FIG. 5 is a schematic illustration of a system for the download and playing of audio content from the Internet via a cellular telephone to an in-vehicle stereo, constructed and operative in accordance with a preferred embodiment of the present invention.

Reference is now made to FIG. 5 which is a schematic illustration of a system for the download and playing of audio content from the Internet via a cellular telephone 410 to an in-vehicle stereo 420, constructed and operative in accordance with another preferred embodiment of the present invention. The system of FIG. 5 is suitable for the use with the method of FIG. 4. As shown in FIG. 5, a user 400 verbally requests a specific piece of music. Such a verbal request would typically replace steps 305–330 of FIG. 4.

Although preferred embodiments of the present invention have been described herein with relation to automobiles, the term vehicle as used herein also includes, but is not limited to, land transportation vehicles such as cars, vans, trucks, lorries, buses, jeeps, motorcycles, bulldozers, juggernauts and ambulances, as well as other surface vehicles.

It will be appreciated that certain features of the invention, which are, for clarity, described in the context of separate embodiments, may also be provided in the context of a single embodiment. Conversely, various features of the invention which are, for brevity, described in the context of a single embodiment, may also be provided separately or in any suitable subcombination.

It will further be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

What is claimed is:

1. Apparatus for in-vehicle provision of audio content to a listener, comprising:
   a cellular telephone adapted to receive broadcast radio content over a wireless network; and
   an in-vehicle audio system, adapted to be fixedly installed in a vehicle, and coupled to receive the broadcast radio content from the cellular telephone, and to play the content in the vehicle,
   wherein the broadcast radio content received over the wireless network is user-selected, and
   wherein the audio system is adapted to receive, from a user, an input comprising at least one detail regarding the broadcast radio content to be received, and to transmit the at least one detail to the cellular telephone, and
   wherein the audio system comprises a radio receiver fixedly installed in the vehicle and comprising a button on a front panel of the receiver, and wherein the user presses the button on the front panel in order to provide the input.

2. Apparatus according to claim 1 wherein the cellular telephone is adapted to receive the broadcast radio content over the wireless network at a time when the radio content is not being broadcast over radio channels.

3. Apparatus according to claim 1 wherein the cellular telephone is adapted to receive the broadcast radio content over the wireless network at a location where the radio content cannot be received over radio channels.

4. Apparatus according to claim 1 wherein the cellular telephone is adapted to receive from a user, an input comprising at least one detail regarding the broadcast radio content to be received, and to transmit the at least one detail to a content provider over the wireless network.

5. Apparatus according to claim 4 wherein the input comprises a verbal input.

6. Apparatus according to claim 4 wherein the cellular telephone comprises buttons, and wherein the input comprises contacting the buttons.

7. Apparatus according to claim 1 wherein the in-vehicle audio system can function as a radio independent of the cellular phone, and is adapted to receive, as the input, at least one identification detail of the radio station to which the radio is tuned.

8. Apparatus according to claim 7 wherein the at least one identification detail is selected from the group consisting of radio station name, radio station ID code, radio station broadcast frequency, and radio station URL.

9. Apparatus according to claim 7 wherein the at least one identification detail is stored in a memory in the cellular telephone.

10. Apparatus according to claim 1 wherein the wireless network is the Internet and the cellular telephone is WAP enabled.

11. Apparatus according to claim 1 wherein the cellular telephone communicates with the wireless network using a packet-oriented cellular protocol.

12. Apparatus according to claim 11 wherein the wireless network is a GSM network and the packet-oriented cellular protocol is General Packet Radio Service (GPRS).

13. Apparatus according to claim 11 wherein the wireless link uses a Bluetooth communication protocol.

14. Apparatus according to claim 1 wherein the cellular telephone is adapted to transfer the audio content to the in-vehicle audio system via a wireless link therebetween.

15. Apparatus according to claim 1 wherein the cellular telephone is adapted to transfer the audio content to the in-vehicle audio system via a wired link therebetween.

16. Apparatus for storing user radio station preferences, comprising:
   a cellular telephone, having a memory; and
   an in-vehicle audio system, adapted to be fixedly installed in a vehicle and to play broadcast radio content therein, and adapted to receive, from a user, at least one identification detail regarding a radio station preferred by the user, and to transmit the at least one detail to the cellular telephone for storage in the memory,
   wherein the audio system comprises a radio receiver fixedly installed in the vehicle and comprising a button on a front panel of the receiver, and wherein the user presses the button on the front panel in order to provide the at least one identification detail.

17. Apparatus according to claim 16 wherein the cellular telephone is adapted to transmit the at least one detail of the preferred radio station to another in-vehicle audio system.

18. Apparatus according to claim 17 wherein the other in-vehicle audio system is adapted to receive the at least one detail from the cellular telephone and, responsive thereto, to receive and play broadcast radio content from the preferred radio station.

19. Apparatus according to claim 16 wherein the cellular telephone is adapted to receive broadcast radio content from the preferred radio station over a wireless network, and
   the other in-vehicle audio system is coupled to receive the broadcast radio content from the cellular telephone, and to play the content in the vehicle.

20. Apparatus according to claim 16 wherein the at least one identification detail comprises at least one detail selected from the group consisting of radio station name, radio station ID code, radio station broadcast frequency, and radio station URL.

21. A method for the in-vehicle provision of audio content to a listener, the method comprising:
   selecting broadcast radio content to be download by receiving a user input via an in-vehicle audio system of at least one detail regarding the broadcast radio content to be downloaded, and transmitting the at least one detail to a content provider over the wireless network;
   downloading the broadcast radio content over a wireless network to a cellular telephone;
   transferring the content from the cellular telephone to the in-vehicle audio system; and
   playing the content on the in-vehicle audio system to the listener,
   wherein the audio system comprises a radio receiver fixedly installed in the vehicle and comprising a button on a front panel of the receiver, and wherein receiving the user input comprises sensing actuation by the user of the button on the front panel in order to provide the input.

22. A method according to claim 21 wherein the step of downloading content over the wireless network is performed at a time when the content is not being broadcast over radio channels.

23. A method according to claim 21 wherein the step of downloading content over the wireless network is performed at a location where the content can not be received over radio channels.

24. A method according to claim 21 wherein the audio system functions as a radio independent of the cellular phone, and the at least one detail comprises at least one identification detail of the radio station to which the radio is tuned.

25. A method according to claim 24 wherein the at least one detail is stored in a memory in the cellular telephone.

26. A method according to claim 21 wherein the wireless network is the Internet and the cellular telephone is WAP enabled.

27. A method according to claim 21 wherein the cellular telephone communicates with the wireless network using a packet-oriented cellular protocol.

28. A method according to claim 27 wherein the wireless network is a GSM network and the packet-oriented cellular protocol is GPRS.

29. A method according to claim 21 wherein the content is transferred from the cellular telephone to the audio system via a wireless link therebetween.

30. A method according to claim 29 wherein the wireless link uses a Bluetooth communication protocol.

31. A method according to claim 21 wherein the content is transferred from the cellular telephone to the audio system via a wired link therebetween.

32. A method for storing a user's radio station preferences, comprising:
  inputting at least one identification detail regarding a radio station preferred by a user to an in-vehicle audio system;
  transmitting the at least one identification detail to a cellular telephone; and
  storing the at least one detail in a memory in the cellular telephone,
  wherein the audio system comprises a radio receiver fixedly installed in the vehicle and comprising a button on a front panel of the receiver, and wherein inputting the at least one identification detail comprises pressing the button on the front panel in order to provide the at least one identification detail.

33. A method according to claim 32, and also comprising transmitting the stored at least one identification detail to another in-vehicle audio system.

34. A method according to claim 33, and also comprising identifying the preferred radio station from the at least one detail, and responsive thereto, receiving and playing broadcast radio content from the preferred radio station.

35. A method according to claim 32, and also comprising:
  transmitting the stored at least one identification detail, over a wireless network, to an audio content provider;
  identifying the preferred radio station from the at least one detail;
  downloading broadcast radio content over the wireless network to the cellular telephone;
  transferring the content from the cellular telephone to the in-vehicle audio system; and
  playing the content on the in-vehicle audio system to a listener.

36. A method according to claim 32 wherein the at least one identification detail is selected from the group consisting of radio station name, radio station ID code, radio station broadcast frequency, and radio station URL.

* * * * *